United States Patent Office 3,354,615
Patented Nov. 28, 1967

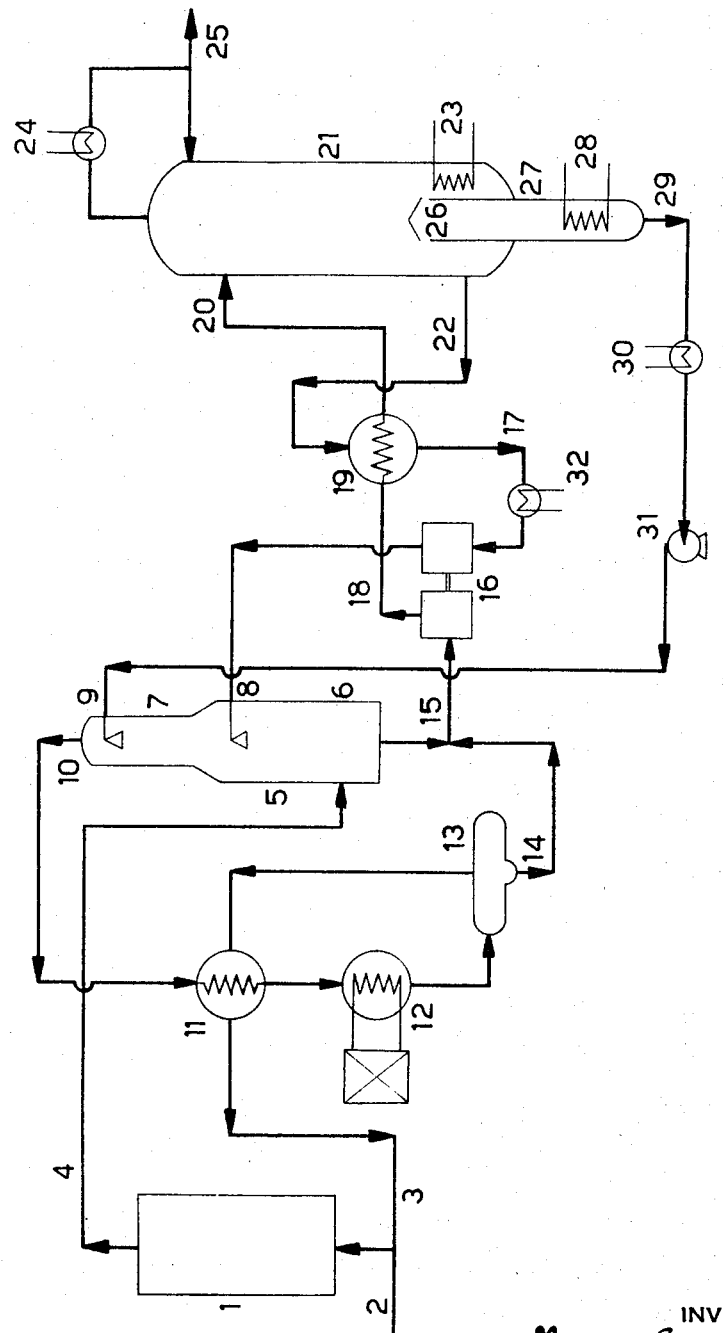

3,354,615
PROCESS FOR THE SEPARATION OF AMMONIA PRODUCED IN MEDIUM AND LOW PRESSURE SYNTHESIZING PLANTS
Mario Guadalupi, Milan, Italy, assignor to SNAM S.p.A., Milan, Italy, a company of Italy
Filed Aug. 2, 1965, Ser. No. 476,560
Claims priority, application Italy, Aug. 7, 1964, 17,230/64, Patent 736,029
3 Claims. (Cl. 55—40)

ABSTRACT OF THE DISCLOSURE

A process for separating ammonia from the effluent gas produced in plants operated at medium and low pressure, particularly 100 to 250 atmospheres. The gas is first washed with an aqueous solution containing 15 to 40% ammonia and with a second aqueous solution containing 1 to 10% ammonia by weight. The ammonia is recovered from the solution.

---

This invention relates to a process for the separation of ammonia from gaseous effluent from plants wherein synthesis of ammonia from hydrogen and nitrogen is effected. The evergrowing demand for synthetic ammonia intended for industrial and agricultural uses is an invitation to provide production units whose potential output is higher and higher. It is known from the prior art that the synthesis of ammonia is carried out in plants which operate at high temperatures and high pressures (400 to 500° C. and 250–600 atm.); said plants require the adoption of special technologies for the construction of the apparatus (reactor, heat-exchangers etc.) and compressors of the reciprocating kind for the compression of the synthesis mixture.

The output obtainable with said reciprocating machines has constituted one of the most stringent limiting conditions imposed on the construction of large production units towards which the modern technology is trending, since, in order to have the necessary rates of flow available, the employment of a plurality of compressors arranged in parallel is necessary, which imposes a heavy initial cost burden.

The rate of flow required by such high-output units, capable of a daily output of ammonia between 800 and 2,000 metric tons, makes the employment of centrifugal compressors necessary, these latter permitting the required outputs be obtained.

The maximum pressures obtainable nowadays from centrifugal compressors reach 200 atm. approx. and thus attention is presently directed to synthesizing units operating at pressures in that range.

The technological problems involved with the low-pressure synthesizing plants are notably simpler and the overall first cost of the installation is reduced.

However, the problem posed with such installations is that of the separation of the ammonia produced at low pressures, from unreacted hydrogen and nitrogen.

In the conventional high-pressure plants, the separation of ammonia is carried out by cooling at temperatures in the range from minus 15° C. to 30° C., depending on the pressure, percentages of ammonia ranging from 2% and 5% being obtained from the tail gases.

In cycles at lower pressures, much lower temperatures would be required and thus the employment of refrigerating equipment, costly and complicated, would be required to bring the mixture of the reacted products to temperatures in the order of about minus 30° C., to obtain in the tail gases percentages of ammonia ranging from 2% and 3%.

It is essential, on account of the smaller number of conversions per passage in the low pressure plants as compared with those in the high pressure plants, to remove as much ammonia as practicable, in order to reduce the amount of gas to be recycled per unit of ammonia discharged.

The reaction product obtained from these low pressure synthesizing plants contains a percentage of ammonia between, as a rule, 9% and 12% on a weight basis, the partial pressure of ammonia being thus notably reduced; all the heat of condensation of ammonia should then be removed by the refrigerating system because the temperature, which could be obtained with water-cooling, does not effect condensation of ammonia at low pressures.

Under these conditions, the low-pressure plant, which recovers ammonia by a refrigerating cycle, would still have to bear high first and upkeep costs.

The early synthesizing plants were run at low pressures, due to the technological problems which had not yet been solved in order to gain access to the high pressure field.

In these processes, the separation of ammonia from the reaction products was carried out by washing with water and by so doing, the percentage of ammonia in the tail gases was quite negligible.

The method, however, was impaired by the really disturbing disadvantage of leaving in the tail gases to be recycled an amount of moisture which would have soon poisoned the catalyst. On the other hand, the adoption of drying systems for the gases to be recycled, involved heavy technical problems and introduced new sources of expenditures both for the construction and the operation of the installation.

It is an object of the present invention to provide a process for the separation of the ammonia produced in plants operated at medium and low pressures, which does not require the adoption of extended refrigeration systems.

Said inventive process, precisely, permits the adoption of the low-pressure, high-output synthesis method without employing powerful refrigerating systems thus achieving remarkable savings with respect to the known art.

An object of the present invention is the separation of the produced ammonia by washing with absorbent aqueous solutions, according to a step sequence which permits the production of a recycle stream consisting of hydrogen and nitrogen, with a virtually non-existent amount of water and with a negligible ammonia content.

It has now been found that the process of separation of ammonia becomes much simpler and cheaper if the separation is carried out by two-stage absorption with aqueous ammonia solutions having different absorbing powers and subsequently condensing the ammonia and the water which are still left in the gases to be recycled.

In the first stage the absorption of the major fraction of produced ammonia takes place by means of an absorbing ammoniacal solution containing from 15% to 40% of ammonia on a weight basis.

In the second stage the absorption is completed by a weakly ammoniated solution having an ammonia content ranging from 1% and 10% on a weight basis.

The gases discharged from the top of the absorption system have an overall content of ammonia and water which is very slight and ranges from 2,000 to 10,000 p.p.m., and preferably is maller than 6,000 p.p.m. Since these percentages could exert a detrimental influence on the synthesis and, more particularly the presence of water in such a proportion would still be strongly dangerous for the catalyst, the water percentage is still more reduced.

The gaseous mixture is then cooled in a refrigerating system of modest power, since it is necessary substantially to remove only the gases' sensible heat. As a matter of fact, by bringing the gaseous mixture at temperatures in the range from −20° C. to −30° C., total removal of water is obtained in the form of an ammoniated solution which contains from 25% to 50% of $NH_3$ on a weight basis.

The gases still contain ammonia in a negligible amount (from 500 to 2,000 p.p.m.) and are recycled to the synthesis. The ammoniated solution obtained from the absorption system, and containing an amount of ammonia ranging from 40% to 75% on a weight basis, is fed into a distillation and rectification system which operates at pressures between 15 and 30 atm., from which the following fractions are obtained:

(1) Virtually anhydrous liquid ammonia.
(2) An ammoniated solution containing from 15% to 40% by weight of ammonia.
(3) A weakly ammoniated solution containing from 1% to 10% of ammonia on a weight basis.

By way of non-limiting example, a typical embodiment of the inventive process will be described with the aid of the figure of the accompanying drawing, it being understood that many other alternative embodiments are possible and that it is not intended to limit the scope of the invention to the case illustrated.

A reactor 1 is fed, through the conduit 2, with the fresh gases to be synthesized, and, via the conduit 3, with the recycled gases.

The admixture of the reaction products, through the conduit 4, is sent to the absorption system 5, consisting of the two sections 6 and 7.

The first section 6 is fed with an absorbing solution through the conduit 8, said solution having an ammonia content of from 15% to 40% by weight.

The second section 7 is fed with a different absorbing solution through the conduit 9, said latter solution having an ammonia content of from 1% to 10% by weight.

From the absorption system 5, operating at the same synthesizing pressure (130–200 atm. and over) and at temperatures ranging from 0° C. and 100° C., the head gas, consisting of hydrogen and nitrogen and having a total percentage of water and ammonia from 2,000 to 10,000 p.p.m. is discharge via the conduit 10.

Said head gas is cooled, by the exchanger 11 and the refrigeration system 12, at temperatures comprised between −20° C. and −30° C. The condensed vapours, formed by an ammoniated solution, are separated from the cooled gas through the separator 13, said solution being then combined with the other ammoniated solution through the conduit 14. The thusly purified gas is recycled via the conduit 3.

The enriched ammoniated solution obtained from the system 5 is sent, through the conduit 15, to the recovery system 16 wherein the energy possessed by the solution is yielded to the "lean" absorbing solution introduced therein through the conduit 17. This is restored to the pressure predominant within the absorption system 5.

The enriched ammoniated solution, containing from 40% to 75% by weight of ammonia, is discharged from the energy recovery system 16 and, through the conduit 18, the heat exchanger 19 and the intake 20, is introduced into the distillation and rectification column 21.

Said column 21, operative at pressures in the range 15 to 30 atm., provides the treatment for the major fraction of the solution coming from 5, distilling same until a residual ammonia content of from 15% to 40% by weight is achieved, finally discharging it through the conduit 22. Heat is supplied to said column 21 from a coil 23, fed by low pressure steam.

From the head of the column 21 a vapour phase is discharged, which is essentially formed by ammonia: the latter, condensed in a condenser 24, is partly utilized as reflux and partly discharged through the conduit 25.

A portion of the tail product of the column 21, consisting of the ammoniated solution having from 15 to 40% by weight of ammonia, flows through the port 26 into the column 27, wherein said fraction of the tail product is distilled until reaching a final ammonia content of 1 to 10% by weight, the evolved vapour phase ascends along the column and, through the port 26, enters the column 21.

Heat is supplied to said column 27 by the exchanger 28, fed with low pressure steam. Through the discharge 29, the refrigeration system 30 and the pump 31, said weakly ammoniated solution is brought to the absorbing system 5 again, and, precisely, through the conduit 9, to the second absorbing section 7.

The ammoniated solution containing from 15% to 40% of ammonia by weight, coming from 21, is fed, through the conduit 22, the exchanger 19, the conduit 17, cooled in the exchanger 32, newly compressed in the energy recovery system 16 and introduced in the first absorption section 6 through the conduit 8.

The process according to the present invention affords numerous advantages both from a technical and an economical standpoint.

As a matter of fact, a complete separation of ammonia from the synthesis products is obtained. By so doing, the rate of flow of the recycled gases is remarkably reduced, the quantity of produced ammonia being the same and, thus, also the dimensions of the principal component parts of the installation are reduced.

Another advantage worthy of note is the possibility of employing heat at a low temperature and thus a form of energy which is not costly, instead of the large amounts of motive power required for the refrigerating systems required by the prior art.

The adoption of simple and easily operable apparatus, also having a low cost, such as absorption and distillation columns, in replacement of the bulky and costly refrigerating systems, entails a remarkable decrease in both the first and the running costs.

The refrigerating system required according to the process of the present invention has a power requirement in the order of only 10 to 15% as compared with the power required by the processes of the prior art.

The advantages thus obtained are essentially due to the substantial replacement of condensation by cooling, by condensation by absorption, which permits moving the heat of condensation at a higher temperature. In addition, the absorptive method permits reducing the ammonia content of the tail gases to values which cannot practically be achieved with the cooling method.

The embodiments of the invention in which an exclusive property or privilege is claimed are defined as follows:

1. A process for the separation of ammonia produced from hydrogen and nitrogen by synthesis at pressures between 100 and 250 atmospheres, comprising subjecting the reaction products of synthesis to absorption in an absorption system by introducing into the reaction products serially a first absorbing solution having an ammonia content of from 15% to 40% by weight and a second absorbing solution having an ammonia content of from 1% to 10% by weight, while maintaining the synthesizing pressure and a temperature of from 0° to 100° C., cooling the head gas from the absorption system at a temperature between −20° and −30° C., separating the condensed vapors formed by the ammoniated solution from the cooled gas, and recycling the thus purified gas.

2. A process according to claim 1, wherein the enriched solution effluent as bottom from the absorption system is introduced into a recovery system and then distilled in a distillation column at pressures from 15 to 30 atm. until a residual ammonia content of from 15% to 40% by weight is achieved, so that the head gases from the distillation column are discharged in a vapor phase consisting essentially of pure ammonia, utilizing part of this ammonia as reflux, and discharging the remainder thereof.

3. A process according to claim 2, wherein a portion of the tail product of distillation is distilled until a final ammonia content of 1% to 10% by weight is achieved, discharging the gas evolved from this second distillation in a vapor phase into the first-named distillation column, cooling the tail product of the second distillation, and recycling it to the absorption system as the second absorbing solution, cooling the residual portion of the first distillation, having 15% to 40% by weight of ammonia, then compressing this residual portion, and introducing it into the absorption system as the first absorbing solution.

References Cited

UNITED STATES PATENTS

| | | | |
|---|---|---|---|
| 1,216,059 | 2/1917 | Bosch | 55—70 |
| 1,745,730 | 2/1930 | Uhde. | |
| 1,938,598 | 12/1933 | Loud | 23—199 |
| 1,999,546 | 4/1935 | Pyzel | 55—70 |
| 3,054,660 | 9/1962 | Crooks et al. | 23—199 |
| 3,191,916 | 6/1965 | Kurpit et al. | 55—70 X |

REUBEN FRIEDMAN, *Primary Examiner.*

J. ADEE, *Assistant Examiner.*